W. A. LYTTLE.
APPARATUS FOR PRODUCTION OF IRON AND STEEL FROM THE ORE.
No. 169,560. Patented Nov. 2, 1875.
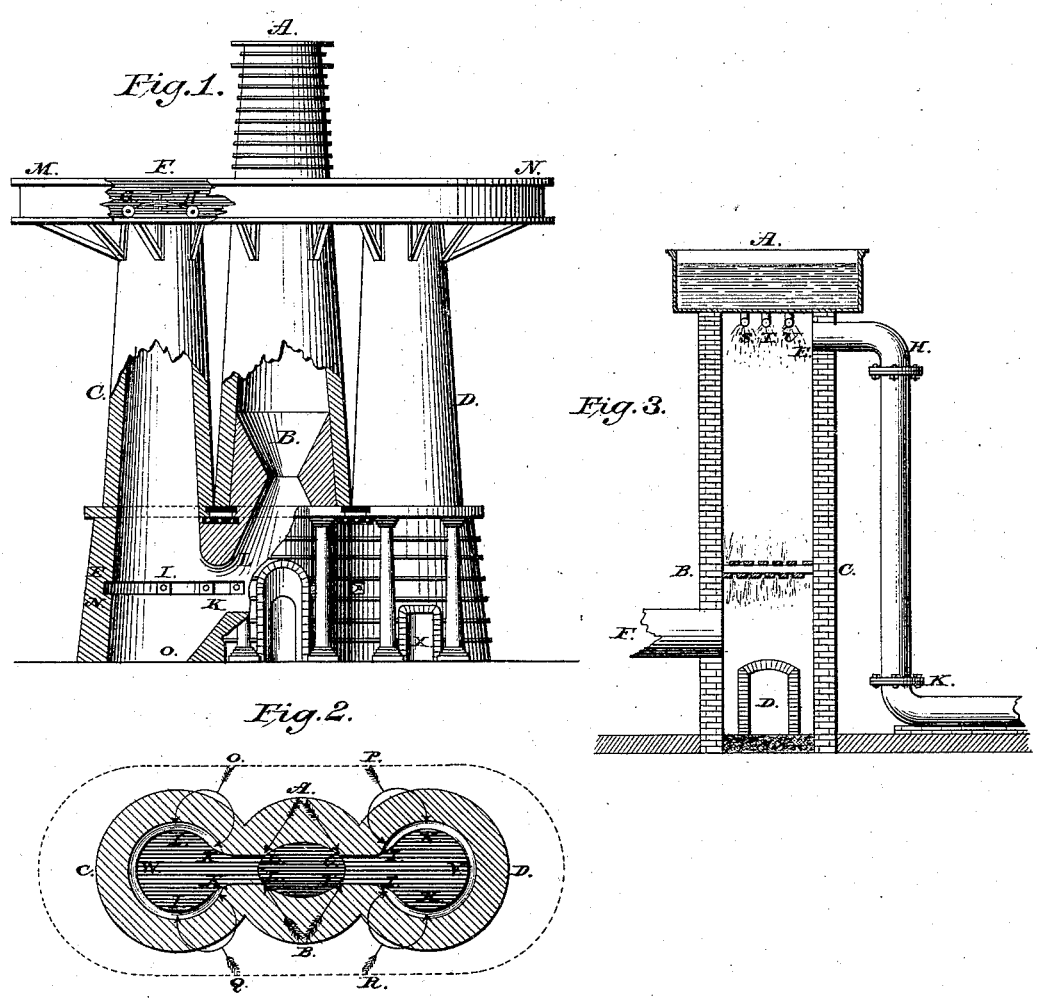

UNITED STATES PATENT OFFICE.

WILLIAM A. LYTTLE, OF THE GROVE HAMMERSMITH, ENGLAND.

IMPROVEMENT IN APPARATUS FOR PRODUCTION OF IRON AND STEEL FROM THE ORE.

Specification forming part of Letters Patent No. 169,560, dated November 2, 1875; application filed May 7, 1875.

*To all whom it may concern:*

Be it known that I, WILLIAM ALEXANDER LYTTLE, of the Grove Hammersmith, in the county of Middlesex, England, civil engineer, have invented an Improvement in the Production of Iron and other Metals from their Ores and in Apparatus therefor; and do hereby declare that the following description, taken in connection with the accompanying sheet of drawings hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention relates to an improved process and apparatus for producing iron and other metals from their ores in a molten condition.

I will first describe my invention as applied to iron ore: According to the said process I employ ore in a pulverulent condition, or I reduce the ore to powder; and in order to facilitate such reduction, in some cases, I heat or roast the oar, and plunge it while hot into water, so that it becomes partially disintegrated. I mix the ore-powder with any plastic earthy material, such as clay, mud, peat, or sediment of sewage, adding, in some cases, lime to increase cohesion, and to take up sulphur and silica, and with carbonaceous matter and suitable fluxing materials. The carbonaceous matter, which is also in a state of powder, may be coal, coke, peat, or charcoal, and I prefer to select such matter as is comparatively free from phosphorus. The quantity of carbonaceous matter is such as to suffice for the reduction of the ore, and also to furnish the fuel necessary for its reduction and fusion. The fluxing materials are selected according to the nature of the ore treated, so as to form with its products a fusible slag, and its quantity will depend also on the nature of the iron, and on the quantity of clay employed to agglutinate the mixture. These ingredients are thoroughly mingled together by any known method of pugging, so as to form a cohesive compound like bricks in their moist condition, and the compound may be molded into bricks, or may be simply extruded in lumps of irregular form and size from the pug-mill. The bricks or lumps of compound may be dried; but this is not necessary when they are to be treated in a furnace such as I will presently describe. Also, when bituminous coal or raw peat is employed as the carbonaceous material, the compound or the lumps thereof may be coked by heat like ordinary coals; but this is also unnecessary.

By dispensing with the drying or coking of the compound a large economy of time and of heating-power is effected.

The bricks or lumps of compound prepared as above described are charged into a vertical furnace or cupola fed at the top, so that the hot gases rising from the lower part of the furnace serve to dry and coke the upper layers of compound before they reach the hot zone of the furnace below.

The form of furnace which I prefer for smelting iron according to this process is represented partly in section and partly in elevation at Figure 1 of the accompanying drawings, a sectional plan of the same being shown at Fig. 2.

The furnace is arranged for the purpose of keeping the fuel out of contact with the material under treatment, the latter being exposed only to the action of the flame or gaseous products of combustion. The central portion A B is the cupola, in which the smelting is effected. On each side of it at C and D is a chamber containing the fuel, made to taper outward toward the base, so that the fuel may descend freely, and constructed of such height that the adhesion of coked fuel to the lower part may be overcome by the weight of the superincumbent mass of fuel. These chambers are provided with covers F at top, which are removed from time to time for charging with fuel, and replaced so as to leave no opening for escape of products of combustion at the top of the chamber. Blasts are directed into the lower part of the fuel-chamber, as indicated by the arrows O P Q R in Fig. 2, and the action of these blasts is distributed uniformly over the mass of fuel at the bottom of the chamber by means of a ring, I, of trough form in section, into which the several tuyeres are led. These blasts may be heated; but I prefer, generally, to employ cold-blasts. The products of combustion from the mass of fuel burning at the bottom of the chamber, finding no escape upward, pass by the passage K L into the cupola A B, and the heat at the base of the cupola may be intensified when required by additional blasts, as indicated by the arrows diverging from A and B, Fig. 2. The bottom of each fuel-chamber of this furnace may be carried down, as a blind, well below the level of the plane of combustion, in which the tuyeres of the blast are placed, and by providing this well with a side door, X, the ash and clinkers may be periodically removed. The bottom of the cupola A B with its hearth, tapping-holes, and other details is of ordinary construction.

It is obvious that an arrangement of furnace such as I have described may be employed for smelting or melting purposes generally, presenting the advantage of keeping the fuel separate from the material under treatment.

When an ordinary cupola or blast furnace is employed for treating the lumps or bricks of compound which I have described, the fuel and lumps of compound are charged in the usual way in alternate layers when the lumps are compounded with only the quantity of carbonaceous matter necessary for reduction. If, however, they are compounded with sufficient of such matter, not only for reduction, but also for furnishing the fuel necessary for fusion, the layers of fuel may be dispensed with, and in that case the lower part of the furnace is charged, in the first instance, with fuel of an open character, such as coke, the combustion of which serves to get up the heat and to dry the lumps of compound fed above, after which the combustion of the fuel in the lower lumps suffices for the continuous working of the furnace without the addition of separate supplies of fuel.

In the above description I have referred to cupolas or furnaces open at the top, whence a large quantity of combustible gas will escape mixed with steam, nitrogen, carbonic anhydride, and other gaseous products.

When it is desired to utilize for heating purposes the combustible gases so escaping it is of advantage to separate from them the watery vapor and carbonic anhydride, as well as to cleanse them from solid particles suspended in them. For this purpose I make the top mouth of the furnace communicate with the lower part of a tall chamber, in which a shower of water is kept falling. The water condenses the steam and throws down the solid impurities, and as a large portion of these consist of lime in a caustic state a considerable portion of the carbonic anhydride is absorbed by combination with the lime and water to form carbonate of lime. The gaseous products, thus to a large extent purified, are conducted from the upper part of the purifying-chamber to be utilized for heating purposes.

Fig. 3 represents a vertical section of a purifying-chamber suitable for operating as I have described. It consists of a tall chamber surrounded by a cistern, A, from which water issues by nozzles S T V, arranged so as to spread it into a diffused shower. The products of combustion from the furnace enter the chamber by the lower pipe F, and ascend in a direction opposite to that of the descending streams of water, being finally conducted away by the pipe E H K. A grating, B C, is with advantage placed in the chamber to break up and distribute more completely the descending streams, and by making this grating of double bars overlapping each other the gaseous ascending currents are brought into more intimate contact with the descending liquid. The water, with the solid matter carried down by it to the bottom of the chamber, may filter away by a gravel-bed, a door, D, being provided for the removal from time to time of the solid matter that is retained.

When lead is smelted, as above described, the purifying-chamber shown in Fig. 3 is of advantage for throwing down and retaining the lead, "smoke," or oxide which is usually lost.

Having thus described the nature of my invention, and the best means I know of carrying the same into practice, I wish it to be understood that I am aware that it has already been proposed to make lumps or loaves composed of iron ore mixed with carbonaceous and fluxing materials for use in a steel-melting furnace, as described in C. W. Siemens' United States Patent, dated 11th April 1871, No. 113,584, and I do, therefore, not claim such process of manufacture. I am also aware that lateral fuel-chambers have been heretofore combined with furnaces; but

I claim—

1. The combination of the cupola in which the smelting is effected, chambers c and D made to taper outward toward the base, cover F, ring I, into which the tuyeres of the blast are led, and passage K L, all relatively arranged as and for the purposes described.

2. The combination of the cistern A, from which water issues by nozzles S T V, pipe F, through which the products from the furnace pass, pipe E H K, grating B C, and door D, as and for the purposes described.

In testimony whereof I have signed my name to this specification in the presence of two subscribing witnesses.

W. A. LYTTLE.

Witnesses:
  J. B. WYNN,
  JNO. P. M. MILLARD.